(12) United States Patent
Auray et al.

(10) Patent No.: US 8,143,535 B2
(45) Date of Patent: Mar. 27, 2012

(54) ELECTRICAL CONNECTOR ASSEMBLY WITH ENHANCED GROUNDING

(75) Inventors: Delbert Auray, Southport, CT (US); Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 446 days.

(21) Appl. No.: 12/322,276

(22) Filed: Jan. 30, 2009

(65) Prior Publication Data

US 2009/0178845 A1 Jul. 16, 2009

Related U.S. Application Data (63) Continuation-in-part of application No. 12/319,304, filed on Jan. 6, 2009, now Pat. No. 7,645,947, which is a continuation of application No. 11/501,131, filed on Aug. 8, 2006, now Pat. No. 7,488,905, which is a continuation-in-part of application No. 11/403,099, filed on Apr. 12, 2006, now Pat. No. 7,151,223, which is a continuation-in-part of application No. 11/400,606, filed on Apr. 7, 2006, now Pat. No. 7,154,042, which is a continuation-in-part of application No. 11/364,435, filed on Feb. 28, 2006, now Pat. No. 7,205,489, which is a continuation-in-part of application No. 11/258,990, filed on Oct. 26, 2005, now Pat. No. 7,057,107, which is a continuation-in-part of application No. 11/151,374, filed on Jun. 13, 2005, now Pat. No. 7,075,007, which is a continuation-in-part of application No. 11/100,250, filed on Apr. 6, 2005, now Pat. No. 7,064,272, which is a continuation-in-part of application No. 10/939,619, filed on Sep. 13, 2004, now Pat. No. 6,916,988.

(60) Provisional application No. 61/063,267, filed on Feb. 1, 2008.

(51) Int. Cl.
*H02G 3/06* (2006.01)
*H02G 3/18* (2006.01)

(52) U.S. Cl. ........ 174/666; 174/665; 174/659; 174/656; 174/650; 439/557

(58) Field of Classification Search ............. 174/666, 174/650, 656, 659, 665, 68.1, 68.3, 72 C, 174/69, 71 R, 664, 70 R; 439/557, 552, 587, 439/92, 142, 320, 507, 567
See application file for complete search history.

(56) References Cited

U.S. PATENT DOCUMENTS

| 1,483,218 A | 2/1924 | Fahnestock |
| 1,725,883 A | 8/1929 | Recker |
| 1,830,250 A | 11/1931 | Tiefenbacher |
| 2,156,003 A | 4/1939 | Tinnerman |

(Continued)

*Primary Examiner* — Angel R Estrada
(74) *Attorney, Agent, or Firm* — Fattibene and Fattibene LLC; Paul A. Fattibene (57) ABSTRACT

An electrical connector assembly having a snap fit adaptor with bent grounding tangs providing improved electrical contact and enhanced grounding. An electrical connector assembly is adapted to snap fit within a knockout hole of an electrical box or panel for making electrical connections. A snap fit adaptor placed on the outlet end of a connector body has a plurality of locking tangs and grounding tangs. The locking tangs hold the connector assembly onto the electrical box, and a distal trailing edge of the grounding tangs extends into the knockout hole in the electrical box and are curved or shaped to provide a large surface area contact improving electrical continuity and providing enhanced electrical grounding. A safer more reliable electrical grounding connecting is made easily and without tools.

16 Claims, 4 Drawing Sheets

U.S. PATENT DOCUMENTS

| | | |
|---|---|---|
| 2,160,353 A | 5/1939 | Conners |
| 2,445,663 A | 7/1948 | Peters |
| 2,744,769 A | 5/1956 | Roeder et al. |
| 2,823,932 A | 2/1958 | Schigut |
| 3,183,297 A | 5/1965 | Curtiss |
| 3,436,105 A | 4/1969 | Miklya |
| 3,544,705 A | 12/1970 | Winston |
| 3,631,738 A | 1/1972 | Harper |
| 3,788,582 A | 1/1974 | Swanquist |
| 3,814,467 A | 6/1974 | Van Buren, Jr. |
| 3,858,151 A | 12/1974 | Paskert |
| 3,993,333 A | 11/1976 | Biswas |
| 4,012,578 A | 3/1977 | Moran et al. |
| 4,021,604 A | 5/1977 | Dola et al. |
| 4,032,178 A | 6/1977 | Neuroth |
| 4,248,459 A | 2/1981 | Pate et al. |
| 4,361,302 A | 11/1982 | Lass |
| 4,468,535 A | 8/1984 | Law |
| 4,619,332 A | 10/1986 | Sheehan |
| 4,621,166 A | 11/1986 | Neuroth |
| 4,626,620 A | 12/1986 | Plyler |
| 4,657,212 A | 4/1987 | Gilmore et al. |
| 4,711,472 A | 12/1987 | Schnell |
| 4,773,280 A | 9/1988 | Baumgarten |
| 4,880,387 A | 11/1989 | Stikeleather et al. |
| 4,981,310 A | 1/1991 | Belisaire |
| 4,990,721 A | 2/1991 | Sheehan |
| 5,132,493 A | 7/1992 | Sheehan |
| 5,171,164 A | 12/1992 | O'Neil et al. |
| 5,189,258 A | 2/1993 | Pratesi |
| 5,266,050 A | 11/1993 | O'Neil et al. |
| 5,342,994 A | 8/1994 | Pratesi |
| 5,422,437 A | 6/1995 | Schnell |
| 6,034,326 A | 3/2000 | Jorgensen |
| 6,043,432 A | 3/2000 | Gretz |
| 6,080,933 A | 6/2000 | Gretz |
| 6,114,630 A | 9/2000 | Gretz |
| 6,133,529 A | 10/2000 | Gretz |
| 6,194,661 B1 | 2/2001 | Gretz |
| 6,335,488 B1 | 1/2002 | Gretz |
| 6,352,439 B1 | 3/2002 | Stark et al. |
| 6,355,884 B1 | 3/2002 | Gretz |
| 6,380,483 B1 | 4/2002 | Blake |
| 6,444,907 B1 | 9/2002 | Kiely |
| 6,476,322 B1 | 11/2002 | Dunne et al. |
| 6,521,831 B1 | 2/2003 | Gretz |
| 6,555,750 B2 | 4/2003 | Kiely |
| 6,604,400 B1 | 8/2003 | Gretz |
| 6,670,553 B1 | 12/2003 | Gretz |
| 6,682,355 B1 | 1/2004 | Gretz |
| 6,737,584 B2 | 5/2004 | Kiely |
| 6,768,057 B2 | 7/2004 | Blake |
| 6,780,029 B1 | 8/2004 | Gretz |
| 6,849,803 B1 | 2/2005 | Gretz |
| 6,860,758 B1 | 3/2005 | Kiely |
| 6,872,886 B2 | 3/2005 | Kiely |
| 6,916,988 B1 | 7/2005 | Auray et al. |
| 7,154,054 B1 | 12/2006 | Gretz ............ 174/655 |
| 7,161,095 B1 | 1/2007 | Gretz ............ 174/655 |
| 7,226,309 B1 | 6/2007 | Gretz ............ 439/460 |
| 7,238,894 B1 | 7/2007 | Gretz ............ 174/655 |
| 7,723,623 B2 * | 5/2010 | Kiely et al. ......... 174/666 |
| 7,952,034 B2 * | 5/2011 | Kiely et al. ......... 174/650 |

* cited by examiner

ELECTRICAL CONNECTOR ASSEMBLY WITH ENHANCED GROUNDING

RELATED APPLICATIONS

This application claims the benefit of provisional patent Application No. 61/063,267 filed Feb. 1, 2008 and is a continuation-in-part of application Ser. No. 12/319,304 filed Jan. 6, 2009, and now U.S. Pat. No. 7,645,947, which is a continuation of application Ser. No. 11/501,131 filed Aug. 8, 2006, and now U.S. Pat. No. 7,488,905, which is a continuation-in-part application of application Ser. No. 11/403,099 filed Apr. 12, 2006, now U.S. Pat. No. 7,151,223, which is a continuation-in-part application of application Ser. No. 11/400,606 filed Apr. 7, 2006, now U.S. Pat. No. 7,154,042, which is a continuation-in-part application of application Ser. No. 11/364,435 filed Feb. 28, 2006, now U.S. Pat. No. 7,205,489, which is a continuation-in-part of application Ser. No. 11/258,990 filed Oct. 26, 2005, now U.S. Pat. No. 7,057,107, which is a continuation-in-part of application Ser. No. 11/151,374 filed Jun. 13, 2005, now U.S. Pat. No. 7,075,007, which is a continuation-in-part of application Ser. No. 11/100,250 filed Apr. 6, 2005, now U.S. Pat. No. 7,064,272, which is a continuation-in-part application of application Ser. No. 10/939,619 filed Sep. 13, 2004, now U.S. Pat. No. 6,916,988, each of which are incorporated herein by reference.

FIELD OF THE INVENTION

This invention relates to an electrical connector assembly for connecting an electrical wire or cable to an electrical box having a knockout hole, and more particularly to an electrical connector assembly having a structure providing enhanced grounding.

BACKGROUND OF THE INVENTION

Heretofore, various electrical connectors and in particular snap fit type electrical connectors are known for connecting electrical wire or cables to an electrical box. Such known snap fit electrical connectors or adaptors have been made the subject of prior U.S. Patents, for example, U.S. Pat. Nos. 1,483,218; 2,744,769; 5,171,164; 5,373,106; 6,114,630; 6,383,439; 6,521,831 and other patents.

Generally, such known snap fit connectors or adaptors are formed of a spring steel material having a circular configuration which is less than a full circle whereby the resiliency of the spring steel under force enables the circular adaptor to expand and contract. Such known snap ring connectors or adaptors are generally provided with outwardly bent grounding tangs arranged to engage the internal periphery of a knock out hole of an electric box or panel. In the operative position of such prior snap fit connectors or adaptors, the trailing edge of the grounding tangs is biased so as to engage the inner periphery or surface of the knockout hole. As such grounding tangs are angularly bent outwardly relative to the plane or axis of the electrical connector or adaptor, the edge of such grounding tangs make only a line contact with the internal periphery or surface of the knockout hole. As a result, only a small surface contact and minimal grounding effect is achieved.

Despite the extensive background relating to electrical connectors, and in particularly those utilizing snap fit adaptors for effecting a snap fit connection to an electrical box or panel, continuing efforts are being made to improve, modify and/or enhance the operability and/or the efficiency of such electrical connectors or adaptors to advance the electrical connector art.

One such improvement is the recently developed frustro-conical shaped snap fit connector or adaptor as described in U.S. patent application Ser. No. 12/006,946, filed Jan. 8, 2008, which is herein incorporated by reference, and was granted as U.S. Pat. No. 7,723,623. Therein, disclosed is a snap fit connector or adaptor provided with grounding tangs that are coincidental or flush with the slope of the frustro-conical plane or surface of the adaptor. As the frustro-conical plane of such adaptors slope radially outward from the leading edge to the trailing edge thereof, the arrangement of the grounding tangs is such that in its operative or working position, the trailing edge of the frustro-conical shaped snap fit connectors or adaptors also functions as a grounding tang that make only a line contact with the internal periphery of a knock out hole.

While the recently developed frustro-conical shaped snap fit connector or adaptor has improved the efficiency of making cable and wire connections to electrical boxes there is a continuing demand for improvement. In particular there is a need to provide improved and enhanced grounding of electrical boxes and connectors.

SUMMARY OF THE INVENTION

An electrical connector assembly having a snap fit adaptor with bent grounding tangs providing improved electrical contact and enhanced grounding. A frustro-conical retainer or snap fit adaptor is attached to the front or outlet end of a connector body. The frustro-conical retainer or snap fit adaptor is adapted to snap fit within a knockout hole of an electrical box. The frustro-conical retainer or snap fit adaptor has grounding tangs that have a trailing edge with a bent portion out of the plane of the grounding tangs and substantially parallel with the longitudinal axis of the connector body. The trailing edge with bent portion provides substantially complete surface contact with the inner peripheral surface of the knockout hole of the electrical box improving electrical grounding of the electrical box. The connector body has retainer means for retaining an electrical wire or cable therein. The retainer means may be a screw, spring steel tangs, or other equivalent retainer.

Accordingly it is an object of this invention to provide a snap fit adaptor for use with an electrical connector assembly that improves or enhances grounding of the electrical connector assembly to an electrical box.

It is an advantage of this invention that it is relatively easily manufactured and does not require any additional parts.

It is another advantage of this invention that the electrical continuity between an electrical box or panel and the electrical connector assembly is substantially improved.

It is yet another advantage of this invention that the substantially improved electrical continuity is accomplished with an easy to use snap fit adaptor or electrical connector.

It is a feature of this invention that a grounding tang has a trailing edge that has a bent portion out of the plane of the grounding tang and substantially parallel to the longitudinal axis of the connector body.

Another object of this invention is to provide a snap fit adaptor for use with an electrical connector that includes a grounding tang capable of maximizing the electrical continuity between the electric box or panel and the snap fit adaptor when in the operable connected position with the electrical connector attached to an electric box or panel.

Another object of the invention is to form or shape the grounding tangs of a snap fit electrical adaptor so as to provide a broad surface to surface contact with the inner periphery surface of a knockout hole so as to maximize the electrical continuity there between.

Another object of this invention is to provide grounding tangs of a snap fit adaptor as utilized in conjunction with either the conventional circular split ring type adaptor or the more recently developed frustro-conical type adaptor with a curvilinear broad, generally cylindrical surface at the trailing edge so as to provide a large surface to surface contact between the grounding tang and the internal periphery surface of the knock out hole so as to maximize the electrical continuity there between.

Another object of this invention is to provide an electrical connector assembly that is relatively simple to fabricate, positive in operation, and economical to produce and sell.

These and other objects, advantages, and features will become more readily apparent in view of the following more detailed description.

DETAILED DESCRIPTION OF THE PREFERRED EMBODIMENTS

Figures 1, 2, 3:
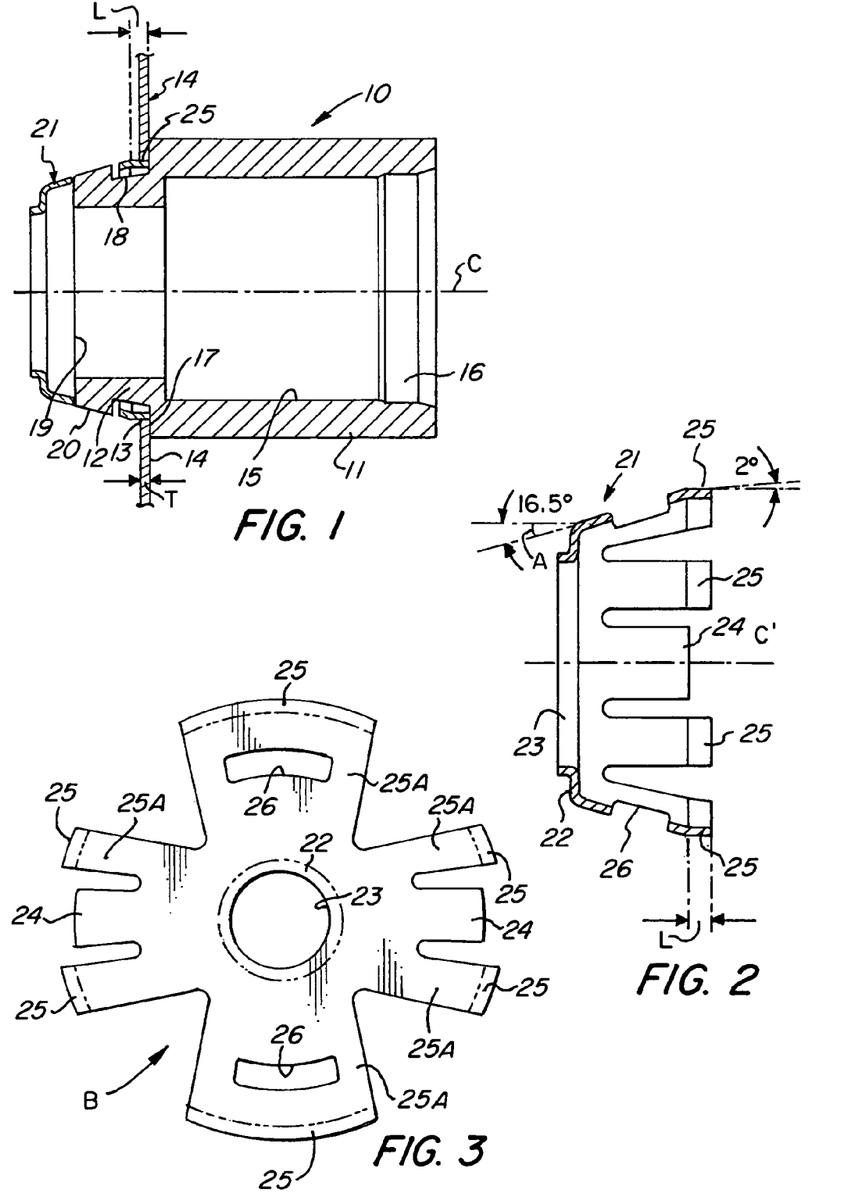
FIG. 1 is a sectional side view of an electrical connector assembly embodying the invention.
FIG. 2 is a sectional view of a snap fit adaptor that embodies the invention as utilized in the connector assembly illustrated in FIG. 1.
FIG. 3 is a plan view of a blank for forming the snap fit adaptor illustrated in FIG. 2.

As illustrated in FIGS. 1-3, the foregoing objects and other features and advantages of this invention are attained by an electrical connector assembly 10 that includes an integrally formed connector body 11 having an outlet end 12 adapted to be secured to a knockout hole 13 of an electrical box or panel 14, and having one or more passageways 15 defining an inlet end 16. A radially outwardly extending flange or shoulder 17 circumscribes the outlet end 12 of the connector body 11 to function as a stop to limit the insertion of the outlet end portion 12 of the connector body 11 through the knockout hole 13 of an electrical box or panel 14. The outlet end portion 12 of the connector body is provided with an outer surface 18 that converges or tapers inwardly toward the outlet opening 19 thereof. Formed on the surface 18 of the outlet end 12 are one or more retaining lugs 20, which may be circumferentially spaced about the outlet end portion 12.

A frustro-conically shaped, snap-fit retainer or adaptor 21 is fitted onto the outlet end portion 12 of the connector body 11. The frustro-conical retainer or adaptor 21 is formed from a blank B, illustrated in FIG. 3, of sheet material, for example spring steel or the like, having a cruciform shape that includes a face portion 22 or simply a central opening 23. The radiating arms of the cruciform blank B are bent or formed about the face portion 22 or a central opening 23 to define a frustro-conical ring or cup shape, as shown in FIG. 2. The retainer ring or cup shape so formed is provided with blanked out or die cut tangs to define outwardly bent locking tangs 24 and grounding tangs 25A. The trailing edge 25 of the frustro-conical ring or cup, formed at the free end of the grounding tangs 25A, provides for electrical grounding in the operative or connected position of the electrical connector assembly 10 to an electric box or panel 14. Each of the grounding tangs 25A have a trailing edge 25 that is bent so as to have a surface substantially parallel to the center axis C. By substantially parallel it is meant that the surface of the trailing edge 25 may be as much as 2° from being parallel to the center axis C as illustrated in FIG. 2. The remaining surface of each of the grounding tangs 25A form an angle A of approximately 16.5° from the center axis C. Therefore, the surface of the trailing edge 25 is bent approximately 14.5° from the surface of the grounding tang 25A. The trailing edge 25, therefore, is bent substantially out of the surface of the grounding tangs 25A.

The frustro-conical ring 21 so formed also has a slot 26 formed in opposed grounding tangs 25A adapted to receive the retaining lug 20 when the retaining ring or adaptor 21 is fitted onto the outlet end 12 of the connector body 11. When held in position by the slot 26 and retaining lug 20, the free or trailing edge 25 of the ring or cup adaptor 21 defines a grounding surface that engages the inner periphery or surface of the knockout hole 13 of an electric box or panel 14 for effecting positive electrical continuity or grounding there between.

In this form of the invention the trailing edge 25 of the frustro-conical adaptor 21 are pressed or formed with a surface area that defines an accurate section of a cylinder, the outer surface of which complements the curvature of the internal peripheral surface of the knockout hole 13 creating a large surface to surface contact area. As such the cylindrically formed trailing edge 25 of the adaptor 21 is provided with a linear length L, which is substantially equal to or greater than the thickness T of the wall of the electric box or panel 14. Therefore, maximum electric grounding continuity is achieved. Thus the outer circumlinear or cylindrical surfaces of the trailing edges 25 of the adaptor 21, when in the assembled position as seen in FIG. 1, are disposed so as to create a broad surface to surface contact with the internal periphery of the knockout hole 13. As a result the surface to surface contact between the cylindrically formed trailing edge 25 of the frustro-conical adaptor 21 and the interior periphery of the knockout hole 13 substantially enhances the electrical connectivity or grounding effect achieved there between. This is best illustrated in FIG. 1 where the cylindrical surface of the trailing edge 25 has a length L substantially equal to or greater than the thickness T of the electrical box 14.

To form the adaptor 21, the cruciform arms of the blank B are arranged to be folded relative to the central opening 23 or face forming portion 22 that circumscribes the central opening 23, to define a unitary frustro-conically shaped cup-like member or ring to compliment or be fitted onto the outlet end 12 of the connector body 11, as shown in FIG. 2. The retainer adaptor 21 thus formed is fitted over or onto the outlet end 12 of the connector body 11 whereby the retaining slot 26 formed in the retainer adaptor 21 is adapted to receive the complementary retaining lug 20 formed on the surface of the outlet end portion for retaining or securing the retainer adaptor 21 on the outlet end portion 12 of the connector body 11.

With the construction described, the connector assembly 10 can be readily inserted through the knockout hole of an electrical or outlet box or panel 14 wherein the locking tangs 24 will initially be flexed inwardly to pass through the knockout hole 13 of an electrical box 14, and then spring outwardly to lock the connector assembly 10 to the electric box or electric panel 14 with the trailing or cylindrically formed grounding trailing edges 25 being inherently biased against the internal periphery of the knockout hole in surface to surface contact to effect a positive electric ground there between as a result of the inherent resiliency of the respective grounding ends, tangs, or trailing edges 25 and the material from which they are formed.

The electrical connector assembly 10 may also be provided with a unidirectional cable or conductor retainer disposed within the inlet passageway or end 16 in a predetermined oriented relationship therein, if desired, as described in U.S. patent application Ser. No. 12/006,946, filed Jan. 8, 2008, which is herein incorporated by reference in its entirety.

Figure 4:
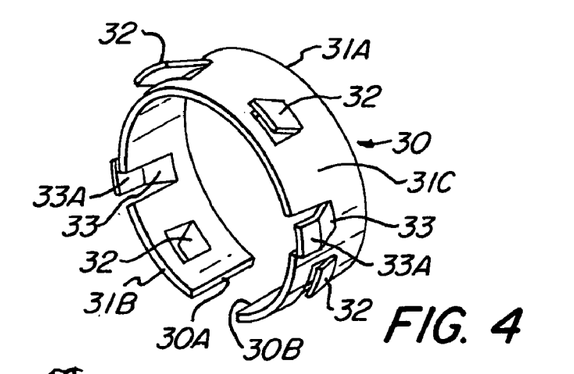
FIG. 4 is a perspective view of another embodiment or a modified form of a snap fit adaptor ring of the invention.
Figure 5:
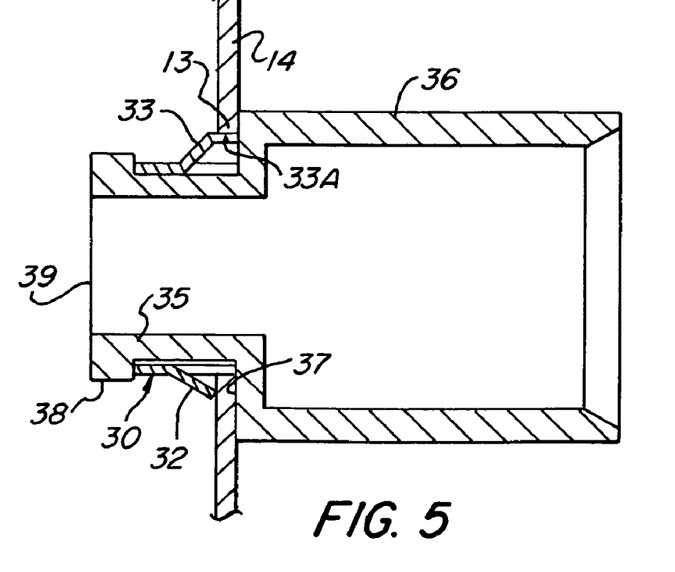
FIG. 5 is a side sectional view schematically illustrating an electrical connector assembly utilizing the modified form of a snap fit adaptor ring illustrated in FIG. 4.
Figure 6:
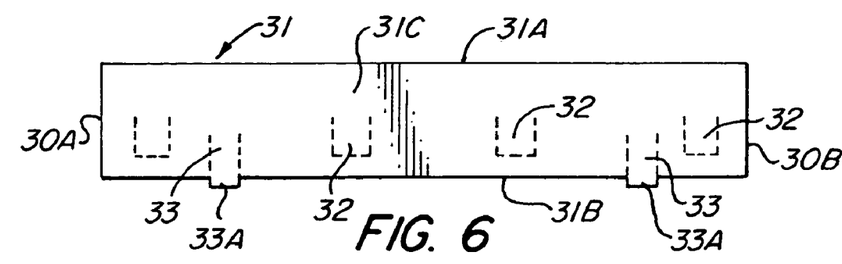
FIG. 6 is a plan view of a blank from which the modified form of snap fit adaptor ring illustrated in FIG. 4 may be formed.

FIGS. 4 to 6 illustrate a modified form of the invention as applied to a circular or cylindrical split ring type of adaptor 30. As shown in FIGS. 4 and 5, the circular split ring adaptor 30 is formed from a blank 31 of spring steel that is rolled into a circular configuration wherein the opposite ends 30A, 30B are slightly spaced apart to define a space there between. Locking tangs 32 and grounding tangs 33 are blanked out of the planar surface of the ring and are outwardly bent at an angle relative to the outer surface of the ring type of adaptor 30. As shown in FIGS. 4 and 5, the outer most ends 33A of the grounding tangs 33 are pressed or formed in a curvilinear arc or a segment of a cylinder to define a surface which complements the internal periphery of the knockout hole 34 of an electrical box 14. The arrangement is such that when the outlet end 35 of the connector body 36 is inserted through the knockout opening 13 of the electrical box or panel 14, the locking tangs 32 are initially forced inwardly and upon the connector assembly being fully inserted through the knockout opening or hole 13, will spring outwardly, due to the inherent resiliency thereof, to lock the connector body 36 to the electric box or panel 14. The distal free ends or outer most ends 33A of the grounding tang 33 form an arcuate portion of a cylinder and are inherently biased to effect a surface to surface contact with the internal periphery of the knockout 13 hole, in a manner heretofore described. As a result, the arrangement provides for maximum continuity and grounding, between the connector assembly and the electrical box or panel 14.

The blank from which the adaptor 30 is formed comprises an elongated blank 31 formed of spring steel which has a leading edge 31A, a trailing edge 31B and an intermediate planar portion 31C there between. The locking tangs 32 are outwardly bent relative to its surface of the blank 31.

As best seen in FIG. 6, the distal free ends or outer most ends 33A of the grounding tangs 33 project slightly beyond the trailing edge 31B of the blank 31. Thus when the grounding tangs 33 are outwardly bent from the planer portion 31C, the trailing free edge, distal, or outer most ends 33A of the grounding tangs 33 are arcuately formed so as to define a segment of a cylindrical configuration, as illustrated in FIGS. 4 and 5, to form a surface to surface contact with the internal periphery of the knockout hole or opening 13, as best seen in FIG. 5.

In the form of the invention as illustrated in FIG. 5, the retainer adaptor 30 is retained on the outlet end 35 of the connector body 36 between the stop shoulder or flange 37 and a front flange 38 circumscribing the outlet opening 39.

Figure 7:
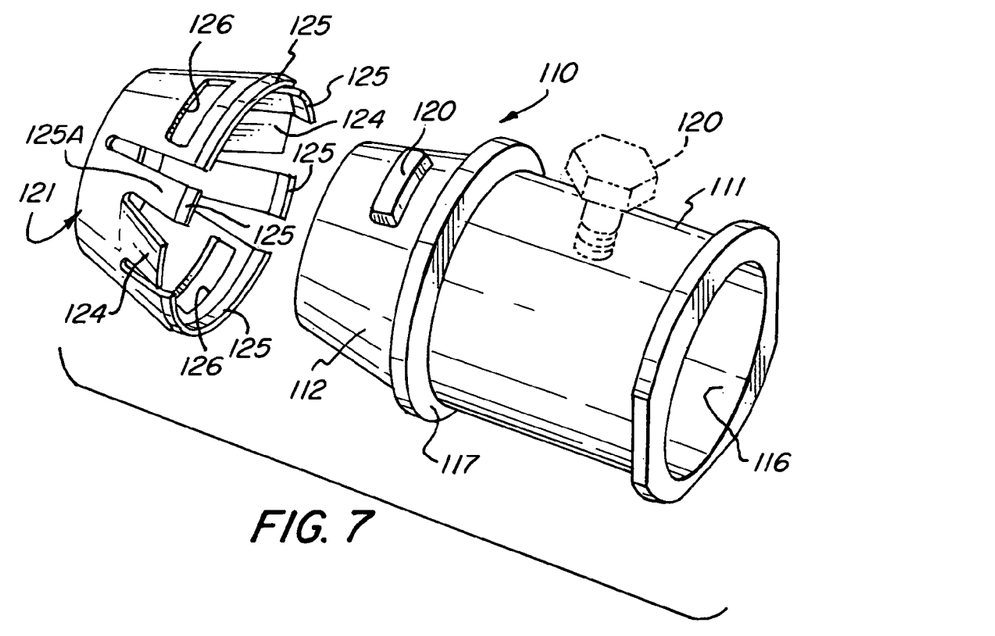
FIG. 7 is a perspective view of an embodiment of the invention using a fastener means for retaining a conductor wire or cable in the body of the electrical connector assembly.

FIG. 7 is a perspective view illustrating another embodiment of the present invention having a set screw means for holding a wire or cable in the inlet end portion 116. The electrical connector assembly 110 comprises a body 111 and a frustro-conical retainer or retainer ring 121 attached to the outlet end portion 112. The frustro-conical retainer 121 is held onto the outlet end portion 112 by lugs 120 fitting within slots 126. Radially outwardly extending flange 117 acts as a stop and aids the positioning of the frustro-conical retainer 121 and placement of the electrical connector assembly 110 within an electrical box having a knockout hole, not shown. The frustro-conical retainer 121 has a plurality of locking tangs 124 and grounding tangs 125A. The grounding tangs 125A have a distal trailing edge 125 that is bent or angled inward so as to have a curved exterior surface substantially matching the diameter of a knockout hole in which the electrical connector assembly 110 is placed. The distal trailing edges 125 thereby form a relatively large contact surface area with the inner periphery surface of a knockout hole creating good electrical continuity and improved grounding. In the embodiment illustrated in FIG. 7 an electrical wire or cable is held within the inlet end portion 116 by screw 127 extending into the inlet end portion 116.

Figure 8:
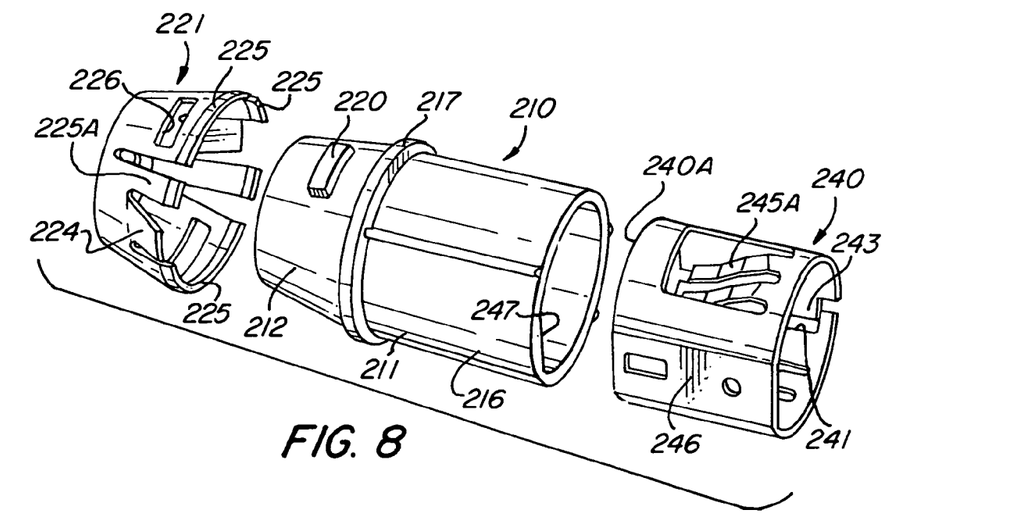
FIG. 8 is a perspective view of an embodiment of the invention using a spring metal tang means for retaining a conductor wire or cable in the body of the electrical connector assembly.
Figure 9:
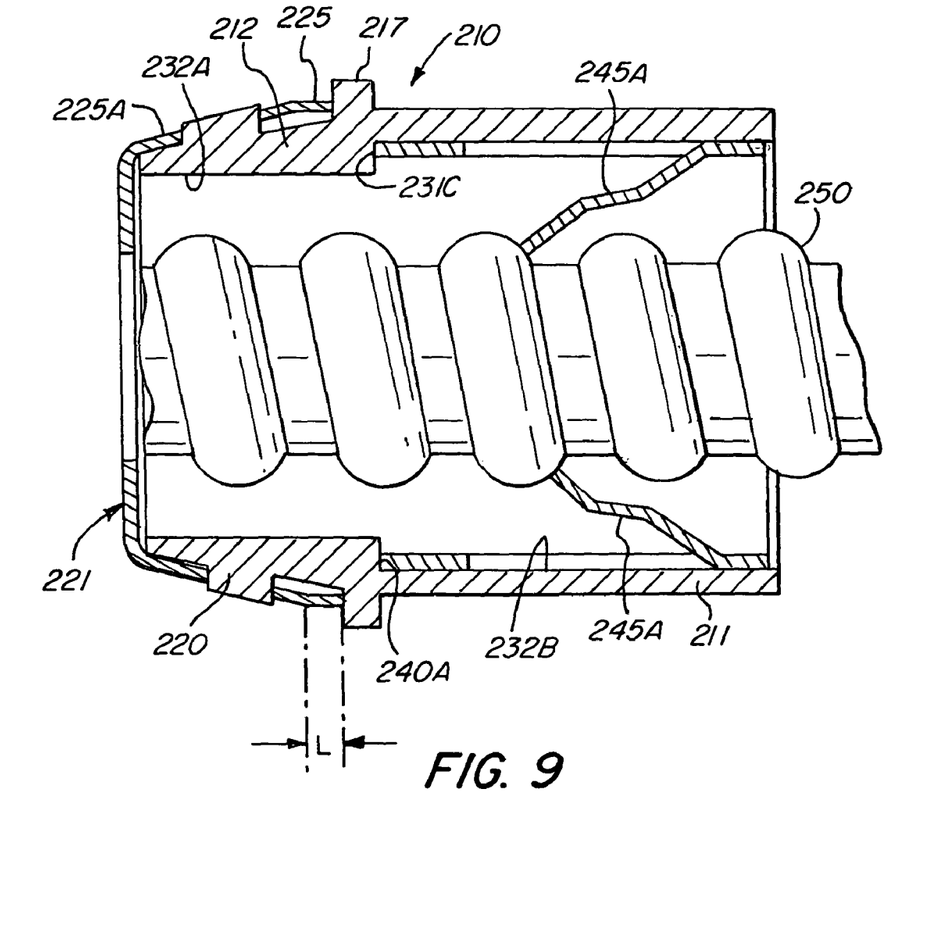
FIG. 9 is a cross section of the electrical connector assembly illustrated in FIG. 8 also illustrating an electrical cable or wire held within the body of the electrical connector assembly.

FIG. 8 is an exploded perspective view illustrating another embodiment of the present invention and FIG. 9 is a cross section thereof. In this embodiment an elongated spring steel blank insert 240 is used as means for retaining an electrical wire or cable within the inlet end 216 of the electrical connector assembly 210. The elongated spring steel blank insert 240 comprises a cylinder formed with notches 241 and projecting tongues 243 and a flattened surface 246. Also formed from the elongated spring steel blank insert 240 is a plurality of finger tangs 243. The plurality of finger tangs 243 hold an electrical wire or cable 250 within the inlet end of the electrical connector assembly 210. The connector body 211 has an inner flat surface 247 that matches or mates with the flattened surface 246. The connector body 211 also has a frustro-conical retainer or retainer ring 221 attached to the outlet end portion 212. The frustro-conical retainer 221 is held onto the outlet end portion 212 by lugs 220 fitting within slots 226. Radially outwardly extending flange 217 acts as a stop and aids the positioning of the frustro-conical retainer 221 and placement in a knockout hole in an electrical box or panel. The frustro-conical retainer 221 has a plurality of locking tangs 224 and grounding tangs 225A. The grounding tangs 225A have a distal trailing edge 225 that is bent or angled inward so as to have curved exterior surface substantially matching the diameter of a knockout hole in which the electrical connector assembly 110 is placed. The distal trailing edges 225 thereby form a relatively large contact surface area with the inner periphery surface of a knockout hole creating good electrical continuity and improved grounding. The distal trailing edge 225 is preferable bent in an arc or curve about a longitudinal axis of the connector body 211 so as to match the round inner peripheral surface of a knockout hole in an electrical box or panel. For a round knockout hole the distal trailing edge 225 would have an arc or curve of a portion or segment of a circle.

FIG. 9 is a cross section of the embodiment illustrated in FIG. 8 and better illustrates the interior of the electrical connector assembly 210 and improved grounding connection provided by the distal trailing edge 225 that is bent or angled inward so as to have a curved exterior surface that matches the inner periphery surface or diameter of a knockout hole or curved around or concentric with the longitudinal axis or center line of the electrical connector assembly 210. The distal trailing edges 225 thereby create a large contact surface area with the knockout hole of an electrical box. The connector body 211 has an outlet end portion bore 232A and an inlet end portion bore 232B separated by an internal shoulder 231C on which the leading edge 240A of the elongated spring steel blank insert abuts. FIG. 9 also clearly illustrates the axial or linear length L of the distal trailing edge 225 on the grounding tang 225A. The axial or linear length of the distal trailing edge 225 is at least as large as the thickness of the wall of an electrical box or panel, as illustrated in FIG. 5.

The present invention provides an enhanced contact surface area between the distal trailing edge 225 on the grounding tang 225A and the inner peripheral surface of a knockout hole in an electrical box or panel. This increased surface area contact creates improved grounding. The improved grounding results in a more reliable and safer electrical connection to an electrical box or panel.

While the invention has been described with respect to the several preferred embodiments, variations and modification can be made without department from the spirit or scope of the invention.

What the claim is:

1. An electrical connector assembly comprising
a connector body having an outlet end portion, and an inlet end portion,
said outlet end portion being adapted to be inserted through a knockout opening of an electric box or panel, the knockout opening having a wall thickness,
a snap fit adaptor fitted onto said outlet end portion,
means for securing said snap fit adaptor onto said outlet end portion,
said snap fit adaptor having a leading end, a trailing end and an intermediate portion there between,
a locking tang blanked out of the surface of the intermediate portion,
said locking tang being angularly bent outwardly relative to the surface of the intermediate portion, and
a grounding tang being angularly bent outwardly relative to the surface of the intermediate portion having a free end extending, when angularly bent, to the trailing end of said snap fit adaptor, the free end being transversely curved to define an arcuate portion of a cylinder and having a contact surface substantially parallel to a center axis of said snap fit adaptor, whereby said arcuate portion is disposed in surface to surface contact with the inner periphery of the knockout opening and the contact surface extends substantially the entire wall thickness of the knockout opening when secured to the electric box or panel providing enhanced electrical grounding.

2. An electrical connector assembly as defined in claim 1 wherein:
said snap fit adaptor is circular in shape.

3. An electrical connector assembly as defined in claim 2 wherein:
said snap fit adaptor is less than a full circle.

4. An electrical connector assembly as defined in claim 1 wherein:
said snap fit adaptor is frustro-conical in shape.

5. An electrical connector assembly as defined in claim 4 wherein:
said frustro-conical adaptor is not split.

6. An electrical connector assembly for attachment to an electrical box having a wall thickness comprising:

a connector body having an inlet end portion and an outlet end portion, and having a bore extending therethrough;
the outlet end portion defining an outlet opening, and the inlet end portion defining an inlet opening;
a radially outwardly extending stop flange on said connector body between the inlet and outlet end portions;
an outer retainer ring circumscribing the outlet end portion having a trailing edge;
means, intermediate the outlet end portion and said radially outwardly extending stop flange, for retaining said outer retainer ring on the outlet end portion;
locking tangs circumferentially spaced about the outer surface of said outer retainer ring, said locking tangs being blanked and bent forming a cantilever out of the surface of said outer retainer ring whereby free ends of said locking tangs are directed toward said radially outwardly extending stop flange;
grounding tangs circumferentially spaced about the outer surface of said outer retainer ring, said grounding tangs being blanked and bent forming a cantilever out of the surface of said outer retainer ring whereby distal ends of said grounding tangs are directed toward said radially outwardly extending stop flange and, when bent, extend to the trailing edge of said outer retainer ring; and
a curved trailing edge formed on the distal end of at least one of said grounding tangs, said curved trailing edge having a curved surface substantially concentric with a longitudinal axis of said connector body,
whereby when said electrical connector assembly is placed in a knockout hole of an electrical box or panel, said curved trailing edge extends into the knockout hole and contacts the inner peripheral surface of the knockout hole over the entire length of the wall thickness enhancing electrical grounding.

7. An electrical connector assembly for attachment to an electrical box as in claim 6 wherein:
said curved trailing edge has a cross section of a segment of a circle.

8. An electrical connector assembly for attachment to an electrical box as in claim 6 wherein:
said outer retainer ring is cylindrical.

9. An electrical connector assembly for attachment to an electrical box as in claim 6 wherein:
comprises a split in said outer retainer ring and a front flange adjacent the outlet end portion.

10. An electrical connector assembly for attachment to an electrical box as in claim 6 wherein:
said means for retaining said outer retainer ring on the outlet end portion comprises a frustro-conical shape having a slot adapted to mate with a lug on the outlet end portion.

11. An electrical connector assembly for attachment to an electrical box as in claim 6 further comprising:
means, attached to said connector body adjacent the inlet end portion, for holding an electrical wire or cable.

12. An electrical connector assembly for attachment to an electrical box as in claim 11 wherein:
said means for holding comprises a screw.

13. An electrical connector assembly for attachment to an electrical box as in claim 11 wherein:
said means for holding comprises tangs.

14. An electrical connector assembly for attachment to an electrical box having a round knockout hole with a wall thickness comprising:

a cylindrical connector body comprising an inlet end portion having an inlet opening, an outlet end portion having an outlet opening, and a bore extending through said connector body;

a stop flange on said connector body between the inlet and outlet end portions;

a frustro-conical outer retainer ring circumscribing the outlet end portion and held thereon by a slot formed in said frustro-conical outer retainer ring and a mating lug formed on said outlet end portion, said outer retainer ring having a trailing edge;

locking tangs circumferentially spaced about the outer surface of said frustro-conical outer retainer ring, said locking tangs being blanked and bent forming a cantilever out of the surface of said frustro-conical outer retainer ring whereby free ends of said locking tangs are directed toward said stop flange;

grounding tangs circumferentially spaced about the outer surface of said frustro-conical outer retainer ring, said grounding tangs being blanked and bent forming a cantilever out of the surface of said frustro-conical outer retainer ring whereby distal ends of said grounding tangs are directed toward said radially outwardly extending stop flange and, when bent, extend to the trailing edge of said outer retainer ring;

a cylindrically curved trailing edge formed on the distal end of at least one of said grounding tangs, said cylindrically curved trailing edge having a curved surface concentric with a longitudinal axis of said connector body and having a shape complementing a segment of the round knockout hole; and means, extending into the bore of said connector body, for holding a wire or cable, whereby when said electrical connector assembly is placed in the round knockout hole of an electrical box or panel, said cylindrically curved trailing edge extends into the round knockout hole and contacts the inner peripheral surface of the round knockout hole over the entire length of the wall thickness enhancing electrical grounding.

15. An electric connector assembly for attachment to an electrical box having a round knockout hole as in claim 14 wherein:

said means for holding a wire or cable comprises a screw.

16. An electric connector assembly for attachment to an electrical box having a round knockout hole as in claim 14 wherein:

said means for holding a wire or cable comprises a tang.

\* \* \* \* \*